(12) United States Patent
Gutierrez et al.

(10) Patent No.: US 6,539,801 B1
(45) Date of Patent: Apr. 1, 2003

(54) Z-AXIS VIBRATORY GYROSCOPE

(75) Inventors: Roman C. Gutierrez, La Crescenta, CA (US); Tony K. Tang, Glendale, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/617,599

(22) Filed: Jun. 29, 2000

Related U.S. Application Data

(60) Provisional application No. 60/141,641, filed on Jun. 29, 1999.

(51) Int. Cl.[7] ................................................. G01P 9/04
(52) U.S. Cl. .................................................... 73/504.12
(58) Field of Search ........................ 73/504.12, 504.14, 73/504.15, 504.16, 504.04, 504.02

(56) References Cited

U.S. PATENT DOCUMENTS

| | | | |
|---|---|---|---|
| 4,674,331 A | 6/1987 | Watson | 73/504.16 |
| 5,203,208 A | 4/1993 | Bernstein | 73/504.12 |
| 5,894,090 A | 4/1999 | Tang et al. | 73/504.12 |

*Primary Examiner*—John E. Chapman
(74) *Attorney, Agent, or Firm*—Fish & Richardson P.C.

(57) ABSTRACT

A microgyroscope having a suspended vertical post uses the Coriolis force to detect the rotation rate. The microgyroscope consists of a single vertical post which senses the rotation rate. The vertical post is supported by multiple silicon suspensions. The vertical post is driven electrostatically to oscillatory in-plane (x and y directions) by vertical capacitors. The Coriolis force induced motions of the vertical post is detected capacitively by the vertical capacitors.

16 Claims, 2 Drawing Sheets

Z-AXIS VIBRATORY GYROSCOPE

CROSS-REFERENCE TO RELATED APPLICATIONS

This application claims benefit of U.S. Provisional Application No. 60/141,641, filed Jun. 29, 1999.

ORIGIN OF INVENTION

The invention described herein was made in the performance of work under a NASA contract, and is subject to the provisions of Public Law 96-517 (35 U.S.C. §202) in which the Contractor has elected to retain title.

TECHNICAL FIELD

This invention relates to vibratory gyroscopes, and more particularly to silicon micromachined vibratory gyroscopes.

BACKGROUND

Multi-axis sensors are highly desirable for inertial sensing of motion in three dimensions. Previously, such sensors were constructed of relatively large and expensive electromagnetic and optical devices. More recently, micromechanical sensors have been fabricated using semiconductor processing techniques. Microelectrical mechanical or "MEMS" systems allow formation of physical features using semiconductor materials and processing techniques. These techniques enable the physical features to have relatively small sizes and be precise. Specifically, micromechanical accelerometers and gyroscopes have been formed from silicon wafers by using photolithographic and etching techniques. Such microfabricated sensors hold the promise of large scale production and therefore low cost.

The integration of three gyroscopic sensors to measure the rotation rates about the three separate axes coupled with three accelerometric sensors to measure the acceleration along the three axes on a single chip would provide a monolithic, six degree-of-freedom inertial measurement system capable of measuring all possible translations and orientations of the chip. There has been some difficulty in constructing a high-performance, or sensitive vibratory rate gyroscope to measure the rotation about the axis normal to the plane of the silicon chip, i.e., the Z-axis.

In a vibratory gyroscope, the Coriolis effect induces energy transfer from the driver input vibratory mode to another mode which is sensed or output during rotation of the gyroscope. Silicon micromachined vibratory gyroscopes are integratable with silicon electronics. These devices are capable of achieving high Q factors, can withstand high g shocks due to their small masses, are insensitive to linear vibration and consume little power. However, most of these micromachined gyroscopes have a very small rotation response, since their input and output vibration modes have different mode shapes and resonant frequencies. The use of different resonant modes also makes these devices very temperature sensitive due to the different temperature dependency of each of the modes. These devices usually have very high resonant frequencies resulting in low responsitivity, since the Coriolis induced response is inversely proportional to the resonant frequency of the structure. Finally, due to the small mass of the structure, thermal noise limits the ultimate performance and use of microgyroscopes. For these reasons, micromachined vibratory gyroscopes have not been used for precision navigation and attitude control applications, but have been employed primarily for automotive applications in which extreme low cost is a major driving factor and performance is.set at a lower premium.

SUMMARY

The present invention is a microgyroscope which uses the Coriolis force to detect the rotation rate. The microgyroscope may comprise a mechanical resonator. The microgyroscope comprises of a single vertical post which is the rotation rate sensing element. The vertical post is supported by four silicon suspension. The vertical post is driven electrostatically to oscillate in-plane (x and/or y directions) by vertical capacitors. The Coriolis force induced motions of the vertical post is detected capacitively by the vertical capacitors. A high performance and small gyroscope is desired for rotation detection of space craft, vehicles and platforms.

DESCRIPTION OF DRAWINGS

These and other features and advantages of the invention will become more apparent upon reading the following detailed description and upon reference to the accompanying drawings.

DETAILED DESCRIPTION

Figure 1:
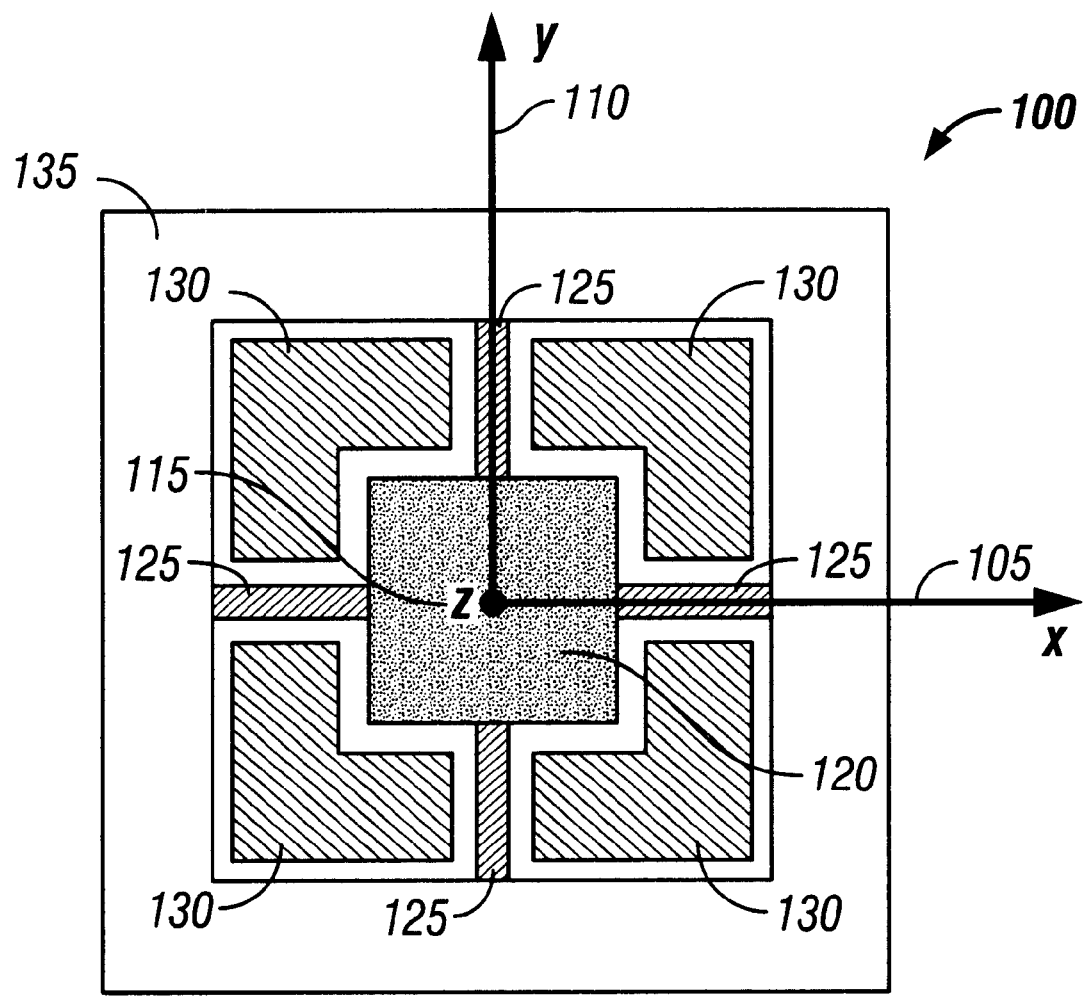
FIG. 1 is a top view of a microgyroscope constructed according to one embodiment of the present invention.

FIG. 1 is a top view of a microgyroscope 100 constructed according to one embodiment of the present invention. The microgyroscope 100 detects forces in the x-direction 105, the y-direction 110, and in the z-direction 115. A vertical post 120 is supported by a plurality of silicon suspensions 125. The suspensions 125 connect the vertical post 120 to a frame 135. Vertical capacitors 130 surround the vertical post 120. The vertical capacitors 130 maybe made from metal or highly doped and conductive silicon. The vertical capacitors 130 provide electrostatic actuation of the vertical post 120 and allow for capacitive detection of the motions of the vertical post 120. The vertical capacitors 130 are positioned to allow the suspensions 125 to connect the vertical post 120 to the frame 135.

Figure 2:
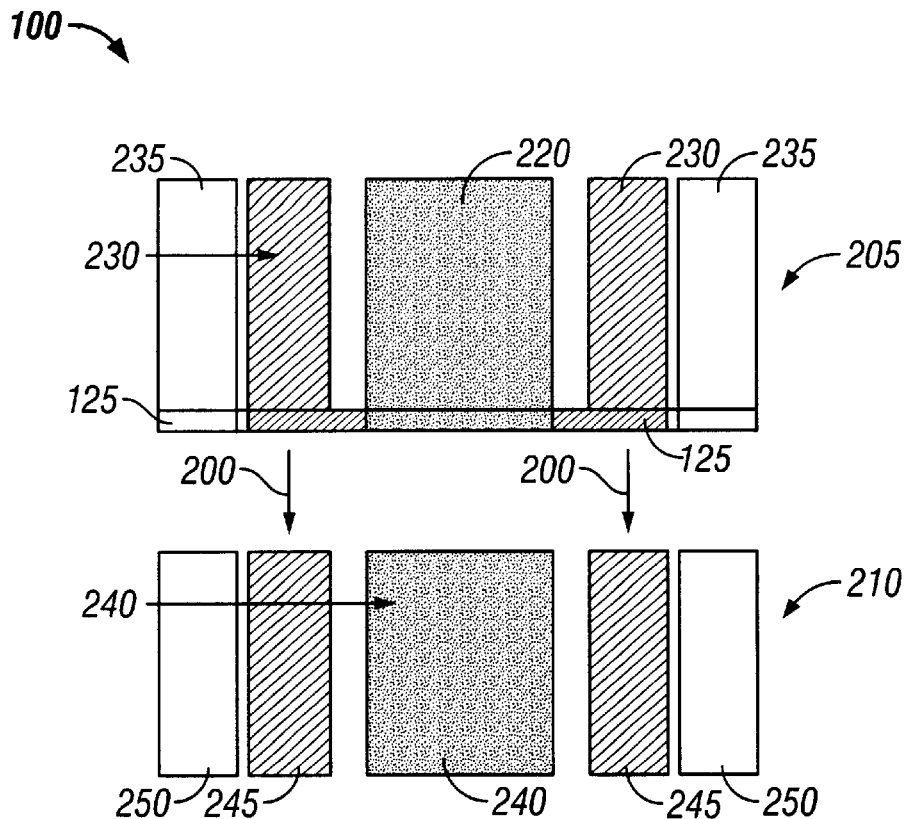
FIG. 2 is a side view of the bonding process for constructing the microgyroscope according to one embodiment of the present invention.

FIG. 2 is a side view of the bonding process for constructing the microgyroscope 100 according to one embodiment of the present invention. A first section 205 of the microgyroscope 100 is made from a first silicon wafer and a second section 210 of the microgyroscope is made from a second silicon wafer. The first section 205 of the microgyroscope 100 includes a first portion 220 of the vertical post 120, first portions 230 of the vertical capacitors 130, a first portion 235 of the frame 135, and the silicon suspensions 125. The second section 210 of the microgyroscope 100 includes a second portion 240 of the vertical post 120, second portions 245 of the vertical capacitors 130, and a second portion 250 of the frame 135. Although the invention is described with the vertical capacitors 130 being constructed of first portions 230 and second portions 245, it can be appreciated that the first portions 230 and second portions 245 may be electrically isolated to create even more independent vertical capacitors 130.

To construct the microgyroscope 100, the first section 205 is positioned above the section 210. The first section 205 is lowered as indicated by reference numeral 200 onto the second section 210. The first and second sections 205, 210 are then bonded together using standard bonding techniques.

The first and second sections 205, 210 are bonded in a position so that the first portion 220 and the second portion 240 of the vertical post 120 are aligned to form one continuous vertical post 120. The first portions 230 of the vertical capacitors 130 are aligned with the second portions 245 of the vertical capacitors 130, and the first portion 235 of the frame 135 is aligned with the second portion 250 of the frame 135. Of course, the first portions 235 and the second portions 250 may be electrically isolated.

Figure 3:
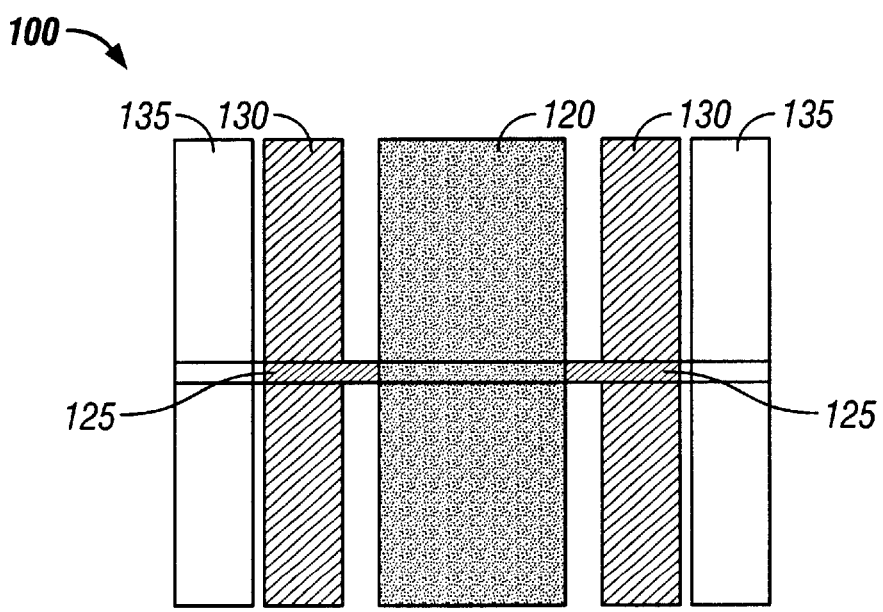
FIG. 3 is a side view of the bonded microgyroscope according to one embodiment of the present invention.

FIG. 3 shows a side view of the completed microgyroscope 100 according to one embodiment of the present invention. Once constructed, the vertical post 120 is connected to the frame 135 via the silicon suspensions 125. As can be seen in FIG. 3, the silicon suspensions 125 are positioned at approximately the mid-point of the vertical post 120. Because the vertical post 120 is connected to the frame 135 via the suspensions 125 at approximately the mid-point, the vertical post 120 is free to move (driven by capacitors 130) in a rocking motion in the x-direction 105 and the y-direction 110. Under input rotation about the z-axis, the Coriolis force causes the vertical post 120 to move in the orthogonal direction to the drive motion. The rotation rate sensitivity is proportional to the input rotation rate, the drive amplitude, and the quality factor of the resonator.

Numerous variations and modifications of the invention will become readily apparent to those skilled in the art. Accordingly, the invention may be embodied in other specific forms without departing from its spirit or essential characteristics.

What is claimed is:

1. A gyroscope comprising:

a frame;

a vertical post positioned within the frame;

a plurality of suspensions that suspend the vertical post near a center of the frame;

a first set of capacitors positioned proximate to the vertical post, the first set being positioned vertically above the suspensions; and a second set of capacitors positioned proximate to the vertical post, the second set being positioned vertically below the suspensions, wherein each capacitor has a height that is significantly greater than a height of each suspension.

2. The gyroscope of claim 1, wherein the plurality of capacitors provide an excitation force for the vertical post.

3. The gyroscope of claim 1, wherein the vertical post is free to move in a z-axis, which is an axis parallel to a longitudinal axis of the vertical post.

4. The gyroscope of claim 1, wherein the plurality of suspensions are positioned at approximately the mid-point of the vertical post.

5. The gyroscope of claim 1, wherein the plurality of suspensions are silicon suspensions.

6. The gyroscope of claim 1, wherein at least one capacitor has a height that is substantially equal to half of a height of the vertical post.

7. The gyroscope of claim 1, wherein the first set of capacitors are bonded to the second set of capacitors.

8. The gyroscope of claim 1, wherein each capacitor is proximate to a corner of the vertical post, the vertical post having a rectangular cross-section.

9. The gyroscope of claim 1, wherein each capacitor has an L-shaped cross-section and is proximate to a corner of the vertical post, the vertical post having a rectangular cross-section.

10. The gyroscope of claim 1, wherein each suspension comprises a thin elongated member with a substantially rectangular cross-section.

11. The gyroscope of claim 1, wherein the suspensions, a first portion of the frame, a first portion of the vertical post and the first set capacitors are formed from a first silicon wafer, and a second portion of the frame, a second portion of the vertical post and the second set of capacitors are formed from a second silicon wafer, the first and second portions of the frame being bonded together to form the gyroscope.

12. The gyroscope of claim 1, wherein each capacitor is positioned between a first vertical plane formed by a first suspension and a second vertical plane formed by a second suspension.

13. The gyroscope of claim 1, wherein the capacitors capacitively detect Coriolis force induced motions of the vertical post.

14. The gyroscope of claim 1, wherein the capacitors electrostatically drive the vertical post to oscillate in a horizontal plane.

15. The gyroscope of claim 1 wherein the gyroscope is operable to detect forces in x-, y- and z-directions.

16. A gyroscope comprising:

a frame;

a vertical post positioned within the frame;

a plurality of suspensions that suspend the vertical post near a center of the frame; and four capacitors positioned proximate to the vertical post, each capacitor having a height that is substantially similar to a height of the vertical post, each capacitor being positioned between a first vertical plane formed by a first suspension and a second vertical plane formed by a second suspension.

* * * * *